United States Patent
Ragsdale et al.

(10) Patent No.: US 6,794,420 B2
(45) Date of Patent: Sep. 21, 2004

(54) METHODS OF PRODUCING STABLE NOVEL BLACK POLYURETHANE ARTICLES WITH POLYMERIC COLORANTS

(75) Inventors: Mark E. Ragsdale, Duncan, SC (US); Jusong Xia, Spartanburg, SC (US); Sandy G. Belue, Landrum, SC (US)

(73) Assignee: Milliken & Company, Spartanburg, SC (US)

( * ) Notice: Subject to any disclaimer, the term of this patent is extended or adjusted under 35 U.S.C. 154(b) by 18 days.

(21) Appl. No.: 10/403,726

(22) Filed: Mar. 31, 2003

(65) Prior Publication Data

US 2003/0195267 A1 Oct. 16, 2003

Related U.S. Application Data

(63) Continuation of application No. 10/036,285, filed on Oct. 26, 2001, now Pat. No. 6,642,283.

(51) Int. Cl.[7] .............................................. C08G 18/28
(52) U.S. Cl. ....................... 521/114; 521/115; 521/128; 521/129; 521/130; 521/170; 521/174
(58) Field of Search ................................. 521/114, 115, 521/128, 129, 130, 170, 174

(56) References Cited

U.S. PATENT DOCUMENTS

| | | | |
|---|---|---|---|
| 4,137,243 A | | 1/1979 | Farmer |
| 4,170,564 A | * | 10/1979 | Brendle ........................ 252/68 |
| 4,284,729 A | | 8/1981 | Cross et al. ................. 521/158 |
| 4,846,846 A | | 7/1989 | Rekers et al. .................. 8/515 |
| 4,992,204 A | | 2/1991 | Kluger et al. .......... 252/301.16 |

* cited by examiner

Primary Examiner—John M. Cooney, Jr.
(74) Attorney, Agent, or Firm—Terry T. Moyer; John E. Vick, Jr.

(57) ABSTRACT

Polyurethane article black colorants which comprise a novel blue polymeric anthraquinone colorant, rather than the previous standard polymeric triphenylmethane blue-type colorants are provided. Such a novel blend of colorants to produce black colorations within the target polyurethane foams exhibits very low color degradation within polyurethane foams, primarily due to the stability and resiliency of the novel anthraquinone-based polymeric colorant in the presence of high isocyanate levels, as well as large amounts of reactive tertiary amines (from catalyst residue, for example). A black colorant comprising such a novel blue polymeric colorant, as well as polyurethane foams comprising such a novel black coloring agent and methods of producing such foams are all contemplated within this invention.

6 Claims, No Drawings

METHODS OF PRODUCING STABLE NOVEL BLACK POLYURETHANE ARTICLES WITH POLYMERIC COLORANTS

CROSS REFERENCE TO RELATED APPLICATIONS

This application is a continuation of application Ser. No. 10/036,285, filed on Oct. 26, 2001, now U.S. Pat. No. 6,642,283. This parent application is herein entirely incorporated by reference.

FIELD OF THE INVENTION

This invention relates to polyurethane article black colorants which comprise a novel blue polymeric anthraquinone colorant, rather than the previous standard polymeric triphenylmethane blue-type colorants. Such a novel blend of colorants to produce black colorations within the target polyurethane foams exhibits very low color degradation during polyurethane foam formation, primarily due to the stability and resiliency of the novel anthraquinone-based polymeric colorant in the presence of high isocyanate levels, as well as large amounts of reactive tertiary amines (from catalyst residue, for example). A black colorant comprising such a novel blue polymeric colorant, as well as polyurethane foams comprising such a novel black coloring agent and methods of producing such foams are all contemplated within this invention.

BACKGROUND OF THE PRIOR ART

This invention relates to a novel black colorant composition, which exhibits very low color degradation during the execution of polyurethane foams. The colorant composition may be incorporated into a resin.

A material will appear black if substantially all of the light in the visible electromagnetic spectrum (400–700 nanometer) is absorbed. Thus, black colorant compositions may be mixtures of two, three or more individual colorants, which compliment each other to absorb light across the spectrum. For example, orange and blue; yellow, red and blue; and orange, blue and purple represent color combinations which will create a black composition.

In general, a black colorant composition made by combining two or more colorants will absorb electromagnetic radiation across the entire visible spectrum, but the absorbance at each wavelength may not be uniform. Consequently, the absorbance of such a composition may be represented by a series of peaks and valleys across the visible spectrum. Loss or modification of any of the component results in change of hue of the black. Such color loss may be caused by any number of conditions however, it has been realized that certain blue polymeric colorants, such as certain triphenylmethane and/or anthraquinone types, that actual degradation of the compounds themselves contributes most prominently to such deleterious color shifts, particularly within foam articles.

Polymeric colorants have become the preferred coloration method in industry for polyurethane products, such as foams, resins, and the like. Being liquid in nature, these polymeric colorants contain hydroxyl terminated polyoxyalkylene chain (or chains) and actually tend to react to and within the urethane during polymerization. As a result, the color is integrated within the foam and provides excellent uniformity and depth throughout the entire article. Generally, these colorations are performed in situ during foam, resin, etc., formation. For instance, polymeric colorants (i.e., polyoxyalkylenated colorants), such as those described in U.S. Pat. No. 4,284,279 to Cross et al., have been introduced within polyol compositions during slabstock foam production. The "colored" polyol then reacts with an isocyanate composition to form the desired colored foam. Such foamed products require the presence of a catalyst or catalysts to effectuate the desired reaction between the polyol and isocyanate components. The most prevalent catalysts, due to cost in using, and disposing, are tertiary amine-based compounds, To reduce emissions of residual amine catalysts, the industry has turned to using hydroxyl-terminated type amine catalysts, most notably DMEA and DABCO TL catalysts (a blend of triethylene diamine and 2-{[2-dimethylamino)ethyl]methylamino}ethanol) and Texacot ZF10 (N,N,N'-trimethl-N'-hydroxyethyl-bis(aminoethyl)ether). These catalysts unfortunately present the ability to exaggerate certain problems within the resultant foams, most notably color loss and/or degradations. Apparently, such catalysts could react with colorants such as TPM-based chromophores as disclosed in U.S. Pat. Nos. 4,992,204 to Kluger et al., during polyurethane formation. The high temperatures associated with polyurethane foam production permits attack of the positively charged TPM polymeric colorants, such as Reactint® Blue X3LV (from Milliken Chemical). With a strong positive charge on the base carbon of such a TPM chromophore, the hydroxyls present within the catalyst are drawn to the colorant and appear to react in some fashion to weaken the necessary strong color-producing positive charge. Such deleterious weakening of the TPM color strength (through the believed degradation of the actual colorant structure itself), thus apparently causes a severe reduction in color and/or a shift of hue within the foam media. Seemingly, such high temperature discolorations and degradations more readily occur between about 15 and 60 minutes after foam generation (after gelation and blowing of the foam-producing composition) has taken place. Without the presence of environmentally unfriendly and thus avoided CFC auxiliary blowing agents, such an exothermic reaction reaches higher temperatures that exaggerate the problem and thus need alternate methods of dissipation in order to permit color retention of the previously utilized blue colorant components of the standard black colorant formulation. Due to the insulating effect of polyurehtane foams as well, these high temperatures are also retained for several hours, if not days, also permitting exaggeration of this problem. Thus, in effect the high temperatures generated in such a manner increase the rate of attack by the hydroxyl of the catalyst on the TPM constituents. As a result, discrete areas within the middle of the final article are most like discolored as compared with the remaining portions of the article.

One specific issue exists in the utilization of polymeric triphenylmethane colorants as components within black formulations, such as within Reactint® Black X77 (from Milliken Chemical), for the coloration of polyurethane foam articles (as mentioned above). Such TPM colorants, which comprise highly desirable polyoxyethylene chains, polyoxypropylene chains, or both, provide extremely effective colorations to target polyurethane media. However, as noted above, certain polymerization catalysts, which happen to be some of the desired catalysts throughout the industry, tend to attack the TPM chromophore at the positively charged carbon center and/or the nitrogen linking groups (present between the TPM backbone and the polymeric chains), thereby degrading the colorants themselves and/or changing the hue thus preventing effective colorations of the target foam article. The target black colorant formulations thus suffer greatly in terms of color retention and exhibit color loss or shade modification (e.g., loss of blue colorant components while leaving the remaining primary colorants constituting the uneffected blend which, as these are generally mixtures of red, yellow, violet, orange, etc., colorants, result in actual shade shifts away from the desired black) as a result of this problem. To solve the above-noted degradation issue, certain anthraquinone-based polymeric colorants, including those disclosed in U.S. Pat. No. 4,137,243 to Farmer, and U.S. Pat. No. 4,846,846 to Rekers et al., have been utilized as an alternative to such TPM-based types for polyurethane foam end-uses. Certain anthraquinone-based blue polymeric colorants have also been utilized as components to replace TPM blues within black formulations, such as within Reactint® Black 2256 (from Milliken Chemical). Although such anthraquinone-type polymeric colorants (such as Reactint® Blue X17, from Milliken Chemical) are less susceptible to degradation due to amine catalyst residues, these previously used polymeric anthraquinones suffer similar degradation characteristics as a result of the presence of higher levels of diisocyanate (hereinafter, "High TDI Index", basically an amount in excess of about 15 weight percent of isocyanate within the entire polyurethane formulation) within the target polyurethane foam pre-cursor formulation (such foams are produced, generally, through the reaction of an isocyanate and a polyol) or the like.

As noted above, during polyurethane foam production, certain tertiary amine-based hydroxyl-group containing catalysts (reactive amine catalysts) have a tendency to attack the cationic carbon center and/or nitrogen linking groups within triphenylmethane (TPM) polymeric blue colorants, such as those disclosed in U.S. Pat. No. 4,992,204 to Kluger et al., thus cause the loss of blue color, particularly at elevated temperatures associated with foam production, thereby reducing their color strength and/or shifting the hue of color within such finished foam articles. Although such tertiary amines do not appear to attack the aliphatic amino anthraquinone-based blue polymeric colorants, such as those disclosed in U.S. Pat. No. 4,137,243 to Farmer, and U.S. Pat. No. 4,846,846 to Rekers et al., to an extent to cause any appreciable color loss, some of such blue colorants have a tendency to lose color strength in (and thus exhibit a loss in stability within) polyurethane foam systems utilizing an elevated isocyanate index (e.g., an excess of isocyanate constituent in an amount above about 15% by total weight) and/or to the high exotherm generated during target foam formation, thus limiting their widespread use within polyurethanes in general. Therefore, improved colorants, particularly blue colorants as components within black colorant formulations for polyurethane foam products, are highly desired to the extent that they exhibit versatility in either tertiary amine catalyzed foams or high isocyanate index foams, as well as other foam types. To date, the best blue polymeric colorants for such a purpose are those noted above which, although they exhibit excellent stability within certain polyurethane media, and other like properties, they also exhibit a certain lack of versatility such that their use is limited to specific targeted foam types.

As a result, any marked improvements in such a manner are of utmost importance within the polyurethane foam production industry. To date, again, there have been no significant or helpful improvements nor advancements disclosed within the pertinent prior art.

OBJECTS OF THE INVENTION

It is therefore an object of this invention to provide a novel stable black colorant composition for the coloration of polyurethane article. It is a further object of this invention to provide a novel polymeric black colorant composition that exhibits high stability in the presence of certain amine catalysts and/or high amounts of isocyanate (high TDI index foams) during polyurethane article formation. Further objectives of this invention are to provide a novel stable polymeric black colorant composition which may be used to color polyurethane foam; a black colorant composition comprised of at least a novel blue polymeric aromatic amino anthraquinone colorant; and/or a black colorant composition comprised of at least one aromatic amine anthraquinone poly(oxyalkylene)-substituted colorant. A further objective is to provide a black coloration method for polyurethane production that effectively reduces and/or eliminates color degradation and shift of hue in association with the presence of either amine-based catalysts or high amounts of isocyanates therein.

SUMMARY OF THE INVENTION

Accordingly, this invention is directed to a black-colored polyurethane article comprising, as at least one colorant component, a blue anthraquinone colorant comprising at least one aromatic amine pendant group attached to the 1-, 4-, or both positions and which optionally, and preferably, exhibits at least one poly(oxyalkylene) chain attached through said at least one aromatic amino group. Also encompassed within this invention is a black colorant formulation comprising the same blue colorant as at least one colorant component therein. In particular, such a blue colorant preferably is defined in accordance with the following structure of Formula (I)

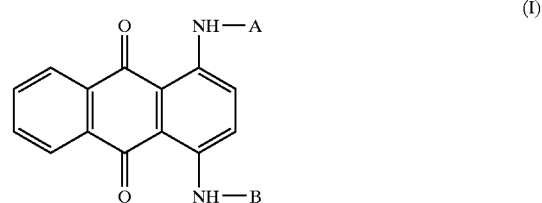

wherein A is selected from the group consisting of hydrogen, $C_1$–$C_8$ alkyl, $C_1$–$C_8$ alkoxy, and the structure of Formula (II)

and B is selected from the group consisting of hydrogen, $C_1$–$C_8$ alky, $C_1$–$C_8$ alkoxy, and the structure of Formula (III)

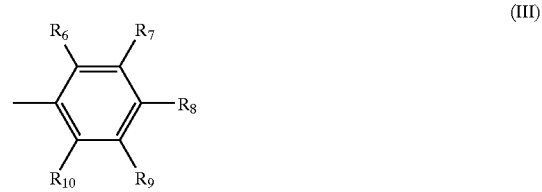

and wherein at least one of A and B is the structure of Formulas (II) or (III); wherein $R_1$, $R_2$, $R_3$, $R_4$, $R_5$, $R_6$, $R_7$, $R_8$, $R_9$, and $R_{10}$ are the same or different and are selected from the group consisting of hydrogen, $C_1$–$C_{20}$ alkyl, $C_1$–$C_{20}$ alkoxy, and Q-E, wherein Q is selected from the group consisting of N, O, S, $SO_2$, $SO_3$, $CO_2$, $SO_2N$, alkyl, and alkoxy, and E conforms to the structure of Formula (IV)

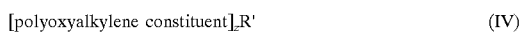

[polyoxyalkylene constituent]$_z$R'  (IV)

wherein z is 1 or 2; polyoxyalkylene constituent is selected from the group consisting of at least three monomers of at least one $C_{2-20}$ alkyleneoxy group, glydicol, glycidyl, or mixtures thereof, monomers of at least one $C_{2-20}$ alkyleneoxy group, glydicol, glycidyl, or mixtures thereof; and R' is selected from the group consisting of hydrogen, $C_{1-20}$ alkyl, $C_{1-20}$ alkylester, halo, hydroxyl, thio, cyano, sulfonyl, sulfo, sulfato, aryl, nitro, carboxyl, $C_{1-20}$ alkoxy, amino, $C_{1-20}$ alkylamino, acrylamino, $C_{1-20}$ alkylthio, $C_{1-20}$ alkylsufonyl, $C_{1-20}$ alkylphenyl, phosphonyl, $C_{1-20}$ alkylphosphonyl, $C_{1-20}$ alkoxycarbonyl, and phenylthio; wherein at least one of $R_1$, $R_2$, $R_3$, $R_4$, or $R_5$ is Q-E and/or at least one of $R_6$, $R_7$, $R_8$, $R_9$, or $R_{10}$ is Q-E. More preferable is the situation wherein said blue colorant conforms to the structure of (V)

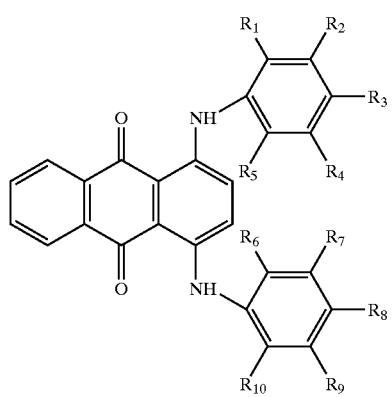

(V)

wherein $R_1$, $R_2$, $R_3$, $R_4$, $R_5$, $R_6$, $R_7$, $R_8$, $R_9$, and $R_{10}$ are the same or different and are selected from the group consisting of $C_{1-20}$ alkyl, halo, hydroxyl, hydrogen, cyano, sulfonyl, sulfo, sulfato, aryl, nitro, carboxyl, $C_{1-20}$ alkoxy, and Q-E, wherein at least one of $R_1$, $R_2$, $R_3$, $R_4$, and $R_5$ is Q-E, and/or at least one of $R_6$, $R_7$, $R_8$, $R_9$, or $R_{10}$ is Q-E, wherein Q is selected from the group consisting of N, O, S, $SO_2$, $SO_3$, $CO_2$, and E is represented by the Formula (VI)

[polyoxyalkylene constituent]$_z$R' (VI)

wherein z is 1 or 2; polyoxyalkylene constituent is selected from the group consisting of at least three monomers of at least one $C_{2-20}$ alkyleneoxy group, glydicol, glycidyl, or mixtures thereof, monomers of at least one $C_{2-20}$ alkyleneoxy group, glydicol, glycidyl, or mixtures thereof, and R' is selected from the group consisting of hydrogen, $C_{1-20}$ alkoxy, $C_{1-20}$ alkyl, and $C_{1-20}$ esters. Preferably, when structure (V) is present, the following conditions are met: $R_3$ is Q-E and $R_1$, $R_2$, $R_4$, and $R_5$ are all hydrogen; $R_8$ is Q-E and $R_6$, $R_7$, $R_9$, and $R_{10}$ and are all hydrogen; wherein Q is O; polyoxyalkylene constituent is selected from the group consisting of from 3 to 50 moles of ethylene oxide and a combination of from 2 to 20 moles of ethylene oxide and from 1 to 20 moles of propylene oxide; z is 1; and R' is hydrogen. More specific compounds of this type of shown below as well.

Also encompassed within this invention is a method of producing a black polyurethane article comprising the steps of: a) providing a polyol composition; b) providing an isocyanate composition; wherein at least one of the compositions of steps "a" and "b" comprises a black colorant formulation comprising at least one blue polymeric anthraquinone colorant as defined above; and c) reacting all of the compositions from steps "a", and "b", together in the presence of either a tertiary amine hydroxy-containing catalyst or in the presence of any other type catalyst but with an amount of isocyanate in excess of 15% by weight of the total reaction mixture. A polyurethane article, preferably though not necessarily a foam article, produced by these methods and/or exhibiting a substantially uniform black coloration throughout is also contemplated within this invention, particularly in the presence of either of said tertiary amine hydroxy-containing catalyst and/or in the presence of such a large amount of isocyanate (including mono, di, and/or polyisocyanates) reactant.

In general, polyurethane foam is produced through the catalyzed polymerization of the reaction products of polyols and isocyanates. Such a reaction is well known throughout the polyurethane industry and has been practiced for many years. The potential number and types of polyols utilized within this invention are plentiful. Such a compound is defined as comprising at least two alcohol moieties, preferably at least three. The free hydroxyl groups react well with the isocyanates to form the urethane components which are then polymerized to form the desired polyurethanes. Blowing agents present within the polymerization step provide the necessary foam-making capability. Preferred polyols thus comprise between three and six alcohol moieties, comprising from between one and six carbon atoms per alcohol moiety. Most preferred is a typical trifunctional polyol, such as F3022 polyol, available from Lyondell.

Isocyanates, most preferred diisocyanates, are well known components of such polyurethane foams and include any compounds which possess at least one free cyanate reactive group, and most preferably two, although more may be utilized. Such compounds may also be aliphatic or aromatic in nature. The most prominently utilized isocyanates, and thus the most preferred types for this invention, are toluene diisocyanate (TDI), diphenylmethane diisocyanate (MDI), and methylene diisocyanate. The polyol is generally reacted with a slight excess of isocyanate (ratio of from 1:0.85 to 1:1.25) to produce a soft flexible foam product; the greater the ratio, the harder the produced foam). For rigid foams the excess isocyanate index is substantially higher (1:2.0 to 1:4.0). In practice, two separate streams of liquids (one of polyol, the other of isocyanate) are mixed together in the presence of a polymerization catalyst and a blowing agent in order to produce the desired polyurethane foam product. As noted above, regular polymeric anthraquinone blue colorants, including aliphatic amino anthraquinones appear to react with such excess amounts of isocyanate and exhibit loss of color and/or change of hue in the final target polyurethane articles.

As noted above, this invention is directed to polyurethanes in general, with foam articles most preferred. Thus, laminates, solid articles, and any other type of colored polyurethane, is encompassed within this invention.

The term "tertiary amine-based hydroxy-containing catalyst" is intended to encompass any reactive amine catalysts including the gelation/blowing catalysts utilized within polyurethane production which comprises at least one amine constituent. As noted above, amine-based catalysts, and more specifically, tertiary amine catalysts, are widely utilized within such specific foam-producing methods. Two catalysts, in particular, DABCO TL and DMEA, are excellent gelation/blowing catalysts for this purpose; however, they also appear to be extremely reactive with and could readily attack unmatched species such as cationic carbon center and/or nitrogen-containing moieties on the phenyl rings of TPM colorants. As noted above, oxidation by the amine readily occurs upon exposure to high temperatures, thus resulting in the undesirable scorched foam portions. Although any amine presents such a potential reactivity (oxidation) problem, and thus is contemplated within the scope of this invention, it has been found that the highly reactive tertiary amines present greater threats to discoloration and degradation to the final foam product. The amount of tertiary amine hydroxy-containing catalyst required to effectuate the desired urethane polymerization is extremely low, from between 0.05 php to about 1.00 php of the entire foam-making composition; more specifically, such a range is from about 0.07 php to about 0.60 php. Even though the number of free amines available are quite low, their ability to deleteriously affect the final foam product through oxidation of free reactive groups (hydroxyls, for example) within colorants, polyols, and other additives, is pronounced upon exposure to high temperature during polymerization.

Such discolorations and/or color degradations are much reduced or do not occur when the TPM component is replaced with the specific inventive aromatic amine-based anthraquinone polymeric blue colorant as defined above. Other coloring agents may be also added within the different streams prior to reaction and/or polymerization as well. Such additions are well known within the industry to produce colored polyurethane foam articles in various colors and shades. Thus, the term "coloring agent" is intended to encompass any pigment, pigment dispersion, polymeric colorant (other than the required at least one anthraquinone type), dye, dyestuff, any mixtures thereof, and the like, which provides desirable colorations to target polyurethane foam articles. In general, such coloring agents are added to the polyol stream (prior to reaction with the isocyanate) in amounts ranging from about 0.001 php to about 10 php. Higher color loadings may provide certain migratory, crocking, and/or bleeding problems. Suitable pigments for this invention include, without limitation, carbon black, lamp black, titanium dioxide, phthalocyanine, and the like. Suitable polymeric colorants for this purpose are disclosed within Cross et al., again without any limitation, and as merely examples: Suitable dyes and dyestuffs include reactive dyes, solvent dyes, vat dyes, and the like.

Other additives or solvents may also be present within the foam-making composition. Auxiliary blowing agents are required to provide the necessary foam blowing capability and reduce chances of combustion. Such compounds include methylene chloride, acetone, carbon dioxide (which may be liberated during the reaction between water and isocyanate), and the like, and are present in amounts of between about 1.0 php and 10 php of the entire foam-making composition. Water may thus also be added in relatively low amount (i.e., from about 1.5 to about 10 pbp; most preferably between about 3 and 5.5 php) to provide carbon dioxide for blowing purposes. Silicones may be added to provide desired cell structure and foam stability and are present in an amount from about 0.1 to about 2 php of the entire foam-making composition; preferably from about 0.5 to about 1.6 php.

The desired black colorant is thus produced through the utilization of such a novel inventive blue anthraquinone-based aromatic amino polymeric colorant, as well as any other components, including, for example, red, yellow, and, possibly, violet and/or orange, as noted in greater detail, below.

DESCRIPTION OF THE PREFERRED EMBODIMENT

Initially, the desired novel inventive blue anthraquinone colorants were produced in accordance with the following procedures:

Synthesis of Intermediates
EXAMPLE 1

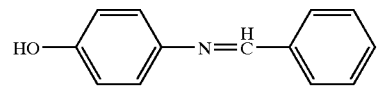

Ethanol (200 proof, 515 g) and p-aminophenol (300 g, 2.75 mol) were charged into a 2L 3-neck round bottom flask equipped with a thermometer and a condenser. Benzaldehyde (292 g, 2.75 mol) was added from an additional funnel while maintaining a slow and steady flow and while stirring. Another portion of ethanol (150 g) was added and the whole mixture was heated to reflux for 1.5 h. After cooling down to room temperature, the solid thus formed was collected by filtration and washed three times with ethanol (3×50 ml) and dried. 492 g (91%) of imine product was obtained as a pale yellow powder.

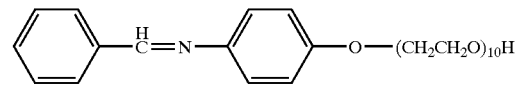

The imine product (285 g, 1.44 mol, from Example 1) was reacted with 634 g of ethylene oxide in 200 ml of toluene, according to the procedures described in U.S. Pat. Nos. 5,082,938 and 5,591,833, to yield 910 g (98.2%) of pale brown yellow liquid product.

EXAMPLE 3

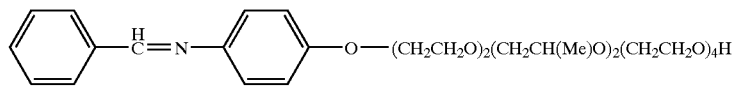

The imine product (1182 g, 6 mol, from Example 1) was reacted, according to the procedures described in U.S. Pat. Nos. 5,082,938 and 5,591,833, with ethylene oxide (528 g, 12 mol), propylene oxide (696 g, 12 mol), and ethylene oxide (1056 g, 24 mol), respectively, in 1400 ml of toluene to yield 3360 g (97%) of the product depicted above as a pale brown yellow liquid.

EXAMPLE 4

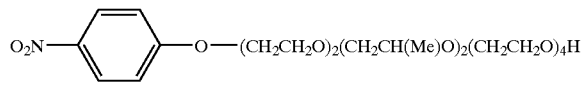

4-Nitrophenol (556 g, 4 mol) was allowed to reacted in toluene (750 g), according to the procedures described in U.S. Pat. No. 5,135,972, with ethylene oxide (352 g, 8 mol), propylene oxide (464 g, 8 mol) and ethylene oxide (704 g, 16 mol), respectively, to generate 2034 g (98%) of the nitrophenol product depicted above as a pale yellow liquid.

EXAMPLE 5

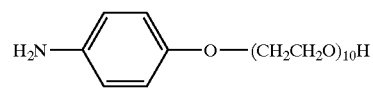

The imine product of Example 2 (340 g, 0.27 mol) was hydrolyzed in the presence of water (150 ml) and hydrochloric acid (56 g) to generate 285 g (97%) of the alkoxylated aniline product depicted above as a light brownish yellow liquid.

EXAMPLE 6

Alternative methods of forming such an intermediate have been followed, such as the following:

Method 1: The imine product of Example 3 (600 g) was hydrolyzed in the presence of water (220 g) and concentrated hydrochloric acid (45 g) or sulfuric acid (15 g) to result in 493 g of the aniline product depicted above as a light brownish yellow liquid.

Method 2: The nitrophenol product of Example 4 (913 g) was hydrogenated in the presence of Pd/C (5%, 10 g) in methanol, according to the procedures described in U.S. Pat. Nos. 5,135,972 and 5,082,938, to yield 804 g of the aniline product depicted above as a pale yellow liquid.

Synthesis of Inventive Polymeric Arylamino Anthraquinone Blue Colorants

EXAMPLE 7

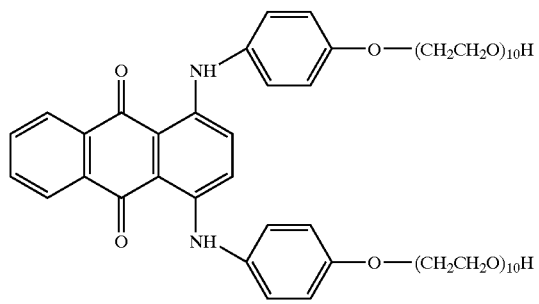

To a 500-ml 3-neck round-bottom flask equipped with a mechanical stirrer, a thermal controller and a reflux condenser, were charged 26.4 g of quinizarin, 9 g of leucoquinizarin, 12 g of boric acid and 60 g of water. After stirred for 10 min under nitrogen gas, the mixture was then charged with 170 g of the alkoxylated aniline product of Example 5. The whole formulation was then heated to 120° C. with a nitrogen gas sweep and the reaction was monitored by UV-vis. After 8 hours of heating, the reaction was complete (UV-vis in MeOH, Abs. $\lambda_{632\ nm}/\lambda_{600\ nm}>1.03$). The reaction mixture was neutralized to pH 6–7 by caustic. Upon removal of water by vacuum stripping, 200 g of the desired product (depicted by the formula above) was obtained as a viscous blue liquid with a color-strength of 8.8 abs./g/L (MEOH) and the maximum absorbency at 632 nm.

EXAMPLE 8

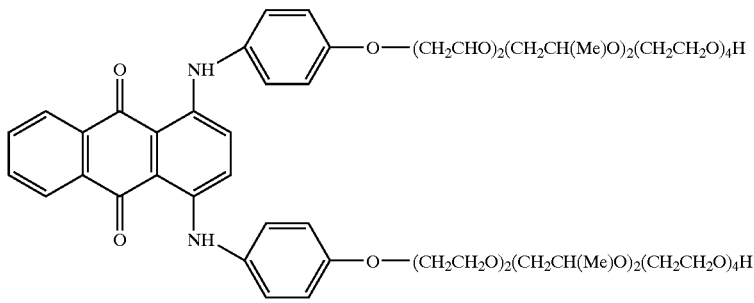

Alternative methods of producing such a colorant exist as follows:

Method 1: To a 250-ml 3-neck round-bottom flask equipped with a mechanical stirrer, a thermal controller and a reflux condenser, were charged 10.6 g (44 mmol) of quinizarin, 3.6 g (15.2 mmol) of leucoquinizarin, 24 g of water and 4.8 g (78 mmol, 1.3 eq) of boric acid. After stirring for 10 min under nitrogen gas, the mixture was then charged 64 g (2.2 eq) of the ethoxylated aniline product of Example 6. The whole formulation was heated to 120° C. with a nitrogen gas sweep and the reaction was monitored by UV-vis. After 9 hours of heating, the reaction was complete (UV-vis in MeOH, Abs. $\lambda_{432\ nm}/\lambda_{600\ nm}>1.03$). After the addition of 80 ml water and neutralization to pH 7–8, the mixture was poured into a separation funnel to settle, and the organic layer was collected. Upon removal of water by vacuum stripping, 46 g of the desired product (depicted by the formula above) was obtained as a viscous blue liquid with a color-strength of 12.5 abs./g/L (MeOH) and the maximum absorbency at 631 nm.

Method 2: To a 500-ml 3-neck round-bottom flask equipped with a mechanical stirrer, a thermal controller and a reflux condenser, were charged 26.4 g (110 mmol) of quinizarin, 9 g (38 mmol) of leucoquinizarin, 60 g of water and 12 g (200 mmol, 1.3 eq) of boric acid. After stirred for 10 min under nitrogen, the mixture was then charged 172 g of the ethoxylated aniline product of Example 6. The whole formulation was heated to 120° C. with a nitrogen gas sweep and the reaction was monitored by UV-vis. After 5 hours of heating, the reaction was complete (UV-vis in MeOH, Abs. $\lambda_{632\ nm}/\lambda_{600\ nm}>1.03$). After the addition of 100 ml water and neutralized to pH 7–8, the mixture was poured into a separation funnel to settle, and the organic layer was collected. The organic layer was then washed 3 times with 130 ml of 20% aqueous ammonia solution. Upon removal of water from the organic layer by vacuum stripping, 172 g of the desired product was obtained as a viscous blue liquid with a color-strength of 10.8 abs./g/L (MeOH) and the maximum absorbency at 631 nm.

Method 3: To a 2000-ml 3-neck round-bottom flask equipped with a mechanical stirrer, a thermal controller and a reflux condenser, were charged 105.6 g of quinizarin, 36 g of leucoquinizarin, 240 g of water and 48 g of boric acid. After stirred for 10 min under nitrogen gas, the mixture was then charged with 752 g of the ethoxylated aniline product of Example 6. The whole formulation was then heated to 120° C. with a nitrogen gas sweep and the reaction was monitored by UV-vis. After 16 hours of heating, the reaction was complete (UV-vis in MeOH, Abs. $\lambda_{632\ nm}/\lambda_{600\ nm}$>1.03). The mixture was cooled to room temperature and washed 3 times with 600 ml of 3% $H_2SO_4$ solution and 1 time with 600 ml of 20% aqueous ammonia solution. Upon removal of water from the organic layer by vacuum stripping, 600 g of the desired product was obtained as a viscous blue liquid with a color-strength of 11.3 abs./g/L (MeOH) and the maximum absorbency at 630 nm.

Method 4: To a 250-ml 3-neck round-bottom flask equipped with a mechanical stirrer, a thermal controller and a reflux condenser, were charged 9 g (37.4 mmol) of quinizarin, 9 g (38 mmol) of leucoquinizarin and 20 g of water. After stirring for 10 min under a nitrogen gas purge, the mixture was then charged 160 g of the ethoxylated aniline product of Example 6 and 12 g (0.2 mol) of boric acid. The whole formulation was then heated to 120° C. with a nitrogen gas sweep. In the meantime, 17.5 g (72.4 mmol) of quinizarin was mixed together to make slurry. After 3 hours of heating at 120° C., portions of 14 g of quinizarin/water slurry was charged into above reaction mixture every hour until it finished. After the last addition, the reaction mixture was continued heating for 3 more hours until the reaction was complete (UV-vis in MeOH, Abs. $\lambda_{632\ nm}/\lambda_{600\ nm}$>1.03). The mixture was cooled to room temperature and washed 3 times with 130 ml of 20% aqueous ammonia solution and the organic layer was collected. Upon removal of water from the organic layer by vacuum stripping, 160 g of the desired product was obtained as a viscous blue liquid with a color-strength of 10.1 abs./g/L (MEOH) and the maximum absorbency at 632 nm.

Polyurethane Foam Article Production

Polyurethane foam articles were produced to investigate any discolorations and/or degradations. Such foams were produced through the reaction of the following components:

| REACTIVE AMINE CATALYST POLYURETHANE FOAM COMPOSITION | |
| --- | --- |
| Component | Amount in mL |
| F3022 Polyol (Lyondell) | 100 |
| Water | 4.53 |
| DABCO TL (catalyst from Air Products) | 0.15 |
| DABCO T10 (catalyst) | 0.30 |
| L520 Silicone (from Witco) | 1.0 |
| 80/20 toluene diisocyanate | 49.0 |
| Black Colorant (as listed below) | 0.9 |

Two comparative, standard black colorants (Comparative Black Colorant Composition 1 and 2) were tested and comprised either REACTINT® Blue X3LV, a triphenyl-methane polymeric colorant comprising polyoxyethylene and polyoxypropylene chains, or REACTINT® BLUE X17, an aliphatic amino anthraquinone-based polymeric colorant, not aromatic amino-based. The compositions were as follows:

| COMPARATIVE BLACK POLYMERIC COLORANT COMPOSITION #1 | |
| --- | --- |
| Component | Amount (in weight percent) |
| REACTINT ® Blue X3LV (from Milliken & Company) | 36.6 |
| REACTINT ® Yellow X15 | 29.0 |
| REACTINT ® Red X64 | 27.2 |
| REACTINT ® Violet X80 | 7.2 |

| COMPARATIVE BLACK POLYMERIC COLORANT COMPOSITION #2 | |
| --- | --- |
| Component | Amount (in weight percent) |
| REACTINT ® Blue X17 | 50.3 |
| REACTINT ® Orange X96 | 43.2 |
| REACTINT ® Red X64 | 6.5 |

One preferred embodiment of the inventive black colorant formulation is the following and was tested in comparison with these two Compositions:

| INVENTIVE BLACK POLYMERIC COLORANT COMPOSITION | |
| --- | --- |
| Component | Amount (in weight percent) |
| Blue from EXAMPLE 8 | 73.4 |
| REACTINT ® Yellow X15 | 12.8 |
| REACTINT ® Red X64 | 13.8 |

Reactive Amine Catalyst Stability Testing

The Inventive black composition and comparative black colorant composition 1 were introduced within individual foam production methods to form target polyurethane foam articles of the same foam formulation as noted above. Upon mixture within a reaction vessel, the reaction of the polyol and isocyanate (and other components, including the colorants) created a "health" bubble (indicating gelation and blowing balance), and the vessel was then exposed to 200° C. (generated within a microwave oven to simulate actual temperatures encountered on an industrial production level) for about 10 minutes. The resultant foam bun was then sliced in half and analyzed empirically. A clear area of discoloration within the center of the bun and extending about 4 inches in each direction was immediately noticed for the comparative polyurethane article made with comparative black composition 1. Also, the same area exhibited a brittle foam possessing characteristics totally different from that of the properly colored foam portions. Such foam articles would be considered off-quality and thus would require disposal. The inventive foam article made from the inventive black composition was also analyzed; no noticeable discoloration or brittleness was observed and thus were acceptable for use.

High TDI Index Stability Test

First, the same procedures but with a different amine catalyst (DABCO 33LV, a triethylene diamine-type in an amount of 0.15 mL, instead of 0.15 ml of DABCO TL) were followed to make standard foam articles (from the inventive black composition only to show compatability with different catalysts with lower amounts of isocyanate). The same procedures were again followed, however, this time 55 mL of the isocyanate (at an Index of 1.25 for the TDI; an amount in excess of about 15 weight % for the total composition) and the different amine catalyst (DABCO 33LV, a triethylene diamine-type in an amount of 0.15 mL, instead of 0.15 ml of DABCO TL), were utilized to prepare sample foam articles from both the inventive black composition and the comparative black composition #2. All of these samples (three different ones) were then analyzed after slicing through the middle of each respective foam bun and evaluating the change in color between the exterior of the foam and the very interior of the same foam article (by comparing the reading in CMC for delta E with an UlstraScans XE Spectrophotometer from HUnterLab). The results are tabulated below with a lower value being more desirable (and thus indicating greater color uniformity throughout the entire article). The sample numbers below are noted for the colorant composition used, with samples 2 and 3 being the High TDI Index foam formulations.

EXPERIMENTAL TABLE
E Values for Sample Foams

| Sample Number | Colorant Composition Used | delta E Value |
| --- | --- | --- |
| 1 | Inventive Black | 4.73 |
| 2 | Inventive Black | 4.69 |
| 3 | Comparative Black #2 | 10.3 |

Thus, while exposure to different catalysts and a high TDI index, the inventive samples (1 and 2) exhibit far improved color retention and thus performance when compared to the standard formulation comprising a commercial blue polymeric colorant component (REACTINT® Blue X17) for the black colorant formulation therein.

Thus, in summation, with reactive amine catalyst residues, the novel black formulations were far more effective at color retention (and thus color uniformity) than the comparative black formulations. Likewise, the high isocyanate amount foam articles exhibited far better results in color retention for the inventive black formulations than for the standard, prior formulations.

While the invention will be described and disclosed in connection with certain preferred embodiments and practices, it is in no way intended to limit the invention to those specific embodiments, rather it is intended to cover equivalent structures structural equivalents and all alternative embodiments and modifications as may be defined by the scope of the appended claims and equivalence thereto.

What we claim is:

1. A method of producing a black polyurethane foam article comprising the steps of:

a) providing a polyol composition;

b) providing an isocyanate composition;

wherein at least one of the compositions of steps "a" and "b" comprises a black colorant formulation comprising, as at least one colorant component, a blue anthraquinone colorant having at least one poly(oxyalkylene) chain is attached through at least one aromatic amino group, to the 1-, 4-, or both positions of said anthraquinone colorant; and wherein said blue anthraquinone colorant conforms to the structure of Formula (I)

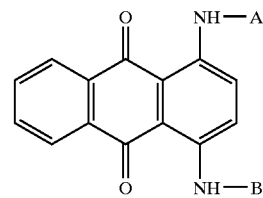

(I)

wherein A is selected from the group consisting of hydrogen, $C_1$–$C_8$ alkyl, $C_1$–$C_8$ alkoxy, and the structure of Formula (II)

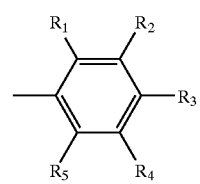

(II)

and B is selected from the group consisting of hydrogen, $C_{1-8}$ alkyl, $C_1$–$C_8$ alkoxy, and the structure of Formula (III)

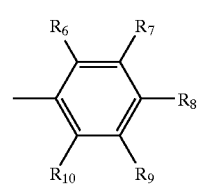

(III)

and wherein at least one of A and B is the structure of Formulas (II) or (III); wherein $R_1$, $R_2$, $R_3$, $R_4$, $R_5$, $R_6$, $R_7$, $R_8$, $R_9$, and $R_{10}$ are the same or different and are selected from the group consisting of hydrogen, $C_1$–$C_{20}$ alkyl, $C_1$–$C_{20}$ alkoxy, and Q-E, wherein Q is selected from the group consisting of N, O, S, $SO_2$, $SO_3$, $CO_2$, $SO_2N$, alkyl, and alkoxy, and E conforms to the structure of Formula (IV)

[polyoxyalkylene constituent]$_z$R'    (IV)

wherein z is 1 or 2; polyoxyalkylene constituent is selected from the group consisting of at least three monomers of at least one $C_{2-20}$ alkyleneoxy group, glydicol, glycidyl, or mixtures thereof, monomers of at least one $C_{2-20}$ alkyleneoxy group, glydicol, glycidyl, or mixtures thereof; and R' is selected from the group consisting of hydrogen, $C_{1-20}$ alkyl, $C_{1-20}$ alkylester, halo, hydroxyl, thio, cyano, sulfonyl, sulfo, sulfato, aryl, nitro, carboxyl, $C_{1-20}$ alkoxy, amino, $C_{1-20}$ alkylamino, acrylamino, $C_{1-20}$ alkylthio, $C_{1-20}$ alkylsufonyl, $C_{1-20}$ alkylphenyl, phosphonyl, $C_{1-20}$ alkylphosphonyl, $C_{1-20}$ alkoxycarbonyl, and phenylthio; wherein at least one of $R_1$, $R_2$, $R_3$, $R_4$, or $R_5$ is Q-E and/or at least one of $R_6$, $R_7$, $R_8$, $R_9$, or $R_{10}$ is Q-E; and c) reacting all of the compositions from steps "a", and "b" together in the presence of either a tertiary amine hydroxy-containing catalyst or in the presence of any other type catalyst but with an amount of isocyanate in excess of 15% by weight of the total reaction.

2. A method of producing a black polyurethane foam article comprising the steps of:

a) providing a polyol composition;

b) providing an isocyanate composition;

wherein at least one of the compositions of steps "a" and "b" comprises the black colorant formulation as defined in claim 1, wherein said blue anthraquinone colorant conforms to the structure of Formula (V)

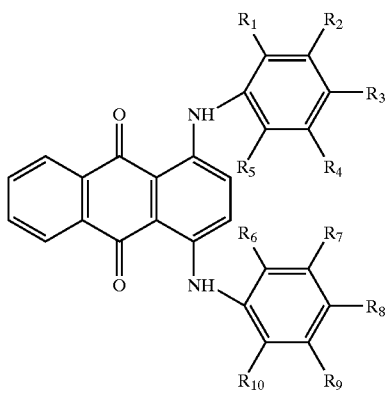

(V)

wherein $R_1$, $R_2$, $R_3$, $R_4$, $R_5$, $R_6$, $R_7$, $R_8$, $R_9$, and $R_{10}$ are the same or different and are selected from the group consisting of $C_{1-20}$ alkyl, halo, hydroxyl, hydrogen, cyano, sulfonyl, sulfo, sulfato, aryl, nitro, carboxyl, $C_{1-20}$ alkoxy, and Q-E, wherein at least one of $R_1$, $R_2$, $R_3$, $R_4$, and $R_5$ is Q-E, and/or at least one of $R_6$, $R_7$, $R_8$, $R_9$, or $R_{10}$ is Q-E, wherein Q is selected from the group consisting of N, O, S, $SO_2$, $SO_3$, $CO_2$, and E is represented by the Formula (VI)

(VI)

wherein z is 1 or 2; polyoxyalkylene constituent is selected from the group consisting of at least three monomers of at least one $C_{2-20}$ alkyleneoxy group, glydicol, glycidyl, or mixtures thereof, monomers of at least one $C_{2-20}$ alkyleneoxy group, glydicol, glycidyl, or mixtures thereof, and R' is selected from the group consisting of hydrogen, $C_{1-20}$ alkoxy, $C_{1-20}$ alkyl, and $C_{1-20}$ esters; and c) reacting all of the compositions from steps "a", and "b" together in the presence of either a tertiary amine hydroxy-containing catalyst or in the presence of any other type catalyst but with an amount of isocyanate in excess of 15% by weight of the total reaction.

3. A method of producing a black polyurethane foam article comprising the steps of:

a) providing a polyol composition;

b) providing an isocyanate composition;

wherein at least one of the compositions of steps "a" and "b" comprises the black colorant formulation as defined in claim 2, wherein $R_3$ is Q-E and $R_1$, $R_2$, $R_4$, and $R_5$ are all hydrogen; $R_8$ is Q-E and $R_6$, $R_7$, $R_9$, and $R_{10}$ and are all hydrogen; wherein Q is O; polyoxyalkylene constituent is selected from the group consisting of from 3 to 50 moles of ethylene oxide and a combination of from 2 to 20 moles of ethylene oxide and from 1 to 20 moles of propylene oxide; z is 1; and R' is hydrogen; and c) reacting all of the compositions from steps "a", and "b" together in the presence of either a tertiary amine hydroxy-containing catalyst or in the presence of any other type catalyst but with an amount of isocyanate in excess of 15% by weight of the total reaction.

4. A black polyurethane foam article produced by the method of claim 1.

5. A black polyurethane foam article produced by the method of claim 2.

6. A black polyurethane foam article produced by the method of claim 3.

* * * * *